United States Patent [19]

Neubert

[11] 4,145,494
[45] Mar. 20, 1979

[54] AQUEOUS FREE RADICAL EMULSION POLYMERIZATION

[75] Inventor: Terry C. Neubert, Ravenna, Ohio

[73] Assignee: The General Tire & Rubber Company, Akron, Ohio

[21] Appl. No.: 904,643

[22] Filed: May 10, 1978

[51] Int. Cl.$^2$ .............................. C08F 2/22; C08F 4/00
[52] U.S. Cl. ........................................ 526/81; 526/80; 526/201; 526/208; 526/224; 526/340; 260/29.75 Q
[58] Field of Search ........................... 526/80, 81, 224; 260/29.75 Q

[56] References Cited

U.S. PATENT DOCUMENTS

| | | | |
|---|---|---|---|
| 2,434,536 | 1/1948 | Arundale | 526/81 |
| 2,523,596 | 9/1950 | Schulze et al. | 526/81 |
| 2,546,244 | 3/1951 | Tucker | 526/340 |
| 2,616,875 | 11/1952 | Adams et al. | 526/83 |
| 2,715,115 | 8/1955 | Blanchette et al. | 260/29.75 Q |
| 2,763,635 | 9/1956 | Tucker et al. | 526/80 |
| 3,099,650 | 7/1963 | Boyer et al. | 526/80 |
| 3,154,527 | 10/1964 | Bice | 526/11.1 |
| 3,188,304 | 6/1965 | Goshorn et al. | 526/224 |
| 3,314,931 | 4/1967 | Davis et al. | 526/79 |
| 3,487,032 | 12/1969 | Guziak | 526/80 |
| 3,506,604 | 4/1970 | Benjamin | 526/81 |
| 3,510,467 | 5/1970 | Azoulay | 526/81 |
| 3,562,240 | 2/1971 | Miletto et al. | 526/81 |
| 3,887,610 | 6/1975 | Kober | 260/491 |
| 4,013,824 | 3/1977 | Uranek et al. | 526/80 |

OTHER PUBLICATIONS

Summary of Current Lit., vol. 58, 1950, Brit. Pat. 635,787.

*Primary Examiner*—Herbert J. Lilling

[57] ABSTRACT

In the aqueous emulsion free radical polymerization of dienes and copolymerization of dienes and vinyl monomers using mercaptan modifiers there is added at at least 75% conversion a large amount of mercaptan modifier as compared to that previously added and the polymerization is stopped at about 90-99+% conversion to provide processable polymers having a reduced amount of or no gel.

2 Claims, No Drawings

AQUEOUS FREE RADICAL EMULSION POLYMERIZATION

BACKGROUND

In aqueous emulsion free radical polymerization of dienes it is known that, if a very large amount of a modifier is used, only low molecular weight soupy or tacky, sometimes fluid, polymers are obtained. If no modifier is used, the polymer becomes so crosslinked that it cannot be handled in the usual rubber processing equipment such as in Banburys and on rubber mills. If a reasonable amount of modifier is used initially or added incrementally or continuously, the modifier becomes for practical purposes exhausted after a while so that short stops have to be added to stop the polymerization at intermediate conversions to prevent excessive crosslinking in order to obtain a processable polymer. In other words, at high conversions, too much gel is formed to obtain a good processing rubber.

DISCUSSION OF THE PRIOR ART

U.S. Pat. No. 2,434,536 discloses the aqueous free radical emulsion polymerization of dienes and mixtures of dienes and vinyl compounds using an aliphatic mercaptan having at least 7 carbon atoms which is added portion wise or continuously. It states that the greatest advantage is realized if not more that 50% of the mercaptan is added initially, 25% is added after 3 or 4 hours of polymerization, and the remaining 25% is added after 45 to 60% or 50% conversion. The ratio of water to reactants is 2 to 1, and the amount of mercaptan used is from 0.125 to 0.5%, based on the water. Thus, the amount of mercaptan is from about 0.25 to 1% based on the monomer(s).

U.S. Pat. No. 2,523,596 discloses the aqueous free radical emulsion copolymerization of dienes and vinyl monomers using mercaptan modifiers. It discloses in column 4, lines 52 to 69, that 0.75 part of mercaptan is added initially with sufficient agitation or stirring (100 r.p.m.) to insure emulsification. Then at 10% conversion 0.6 part of mercaptan is added, and the agitation is increased to 200 r.p.m. Conversion is stopped at 80%. Tertiary hexadecyl mercaptan is apparently preferred.

U.S. Pat. No. 2,616,875 is concerned with shortstopping aqueous free radical emulsion polymerization using as a shortstopper the reaction product of an alkylene polyamine and sulfur. It shows the initial use during polymerization of a mercaptan in an amount of 0.16 to 0.4 part per 100 parts of monomers. It states that conversions are usually 20 to 90%, but it does show one control where conversion went to 100%.

U.S. Pat. No. 3,154,527 discloses a propellant comprising a liquid vinyl pyridine copolymer, an aziridine, an acid, and an oxidizer. Examples IV and VII, the only examples relating to polymerization, show aqueous free radical emulsion polymerization to 60% conversion of the monomers using a mercaptan added initially in the amount of 5 to 7.5 parts per 100 parts of monomers to provide a liquid copolymer.

U.S. Pat. No. 3,188,304 relates to the "cold" rubber process involving free radical aqueous emulsion polymerization of butadiene and styrene below about 50° F., using a 9-11 C atom mercaptan. The amount of mercaptan used is 0.05 to 0.50 part per 100 parts of monomers and is apparently added only initially.

U.S. Pat. No. 3,314,931 discloses the anhydrous polymerization of dienes and vinyl monomers using a metal-organic heterogeneous catalyst and a modifier or regulator which can be a mercaptan. The "regulator employed is added after a part or all of the monomer has been charged and before the polymerization has proceeded too far, or alternatively, in the case of regulators not reacting too rapidly with the catalyst, in dilute concentration in the diene monomer being charged" (column 3, lines 37–42). The working examples show, when using mercaptans, reaction times of about 30 seconds, 0.2–0.4 ml mercaptan per 70–77g butadiene and conversions of 69.5–83%.

U.S. Pat. No. 3,506,604 discloses the aqueous emulsion free radical polymerization of butadiene, styrene and acrylic acid wherein the emulsifier is added continuously during polymerization and at a variable rate based on surface tension measurements. The amount of mercaptan modifier used is from 0.2 to 2 parts per 100 parts of monomer. "A portion of the modifier (5 to 25 percent) is charged to the reactor with the initiator mixture prior to addition of the monomers and the balance is then added simultaneously with the monomers" (column 5, lines 1–4).

U.S. Pat. No. 3,510,467 discloses an aqueous emulsion free radical polymerization of butadiene using a mercaptan modifier. The mercaptan is used in an amount of 0.01 to 0.3% or 0.2 to 0.35 part (column 3, line 41 and column 4, line 41). 15% to 40% of the modifier is added initially and the remainder is added progressively during the polymerization (column 3, lines 54–55 and column 13, lines 28–33). A certain ratio is to be maintained between the quantity of modifier present to the quantity of remaining monomer. Examples 9, 12 and 13 show conversions up to 60.3%. It is stated that the gel content does not exceed 2%, but no data is given.

U.S. Pat. No. 3,887,610 discloses that ethylene is copolymerized with a comonomer such as vinyl acetate, methylacrylate or dimethyl maleate and so forth in aqueous emulsion using a free radical initiator and a chain transfer agent such as a mercaptan in an amount of 0.005 to 0.25 mole per mole of the first comonomer. The examples show the use of 12g (0.06m) of the mercaptan per 200g (2.5m) of vinyl acetate (6:100 ratio). The mercaptan is added initially. The resulting copolymers have molecular weights of 1,500 to 20,000 and are utilized to improve the flow properties of crude oils.

"Summary of Current Literature," Vol. 28, 1950, Research Association of British Manufacturers, Croydon, England, column 538, abstract of British Pat. No. 635,787 states that during emulsion polymerization of butadiene a fixed amount of an emulsion of a modifier is added at a rate proportioned to the total amount of monomer polymerized in a given time. It refers to an example showing the use of an 8-16 C atom aliphatic mercaptan added in an amount of 0.001 to 0.1% by weight per hour until 65% conversion was obtained.

OBJECTS

An object of the present invention is to provide a method for making at high conversions an aqueous free radical emulsion polymer of a diene or a copolymer of a diene and a copolymerizable vinyl monomer which is processable and which has a reduced amount of or no gel.

Another object is to provide such emulsion polymers and copolymers which are processable and which exhibit a reduced amount of or no gel.

These and other objects and advantages of the present invention will become more apparent to those skilled in the art from the following detailed description and working examples.

STATEMENT OF THE INVENTION

According to the present invention it has been discovered that at least one conjugated diene monomer having from 4 to 6 carbon atoms or a mixture of a major amount by weight of at least one conjugated diene monomer having from 4 to 6 carbon atoms and a minor amount by weight of at least one copolymerizable vinyl monomer having not over 14 carbon atoms can be free radical polymerized in aqueous emulsion in the presence of an alkyl or aralkyl mercaptan chain transfer agent having from 8 to 18 carbon atoms wherein at at least 75% conversion of monomer to polymer there is added to the polymerization system an additional amount of said agent in an amount of at least 1½ times by weight the amount by weight of said agent added to the system prior to said 75% conversion and stopping the polymerization in the range of from about 90 to 99+% conversion to obtain a processable polymer with a reduced amount of gel, the total amount of said agent used during the polymerization being from about 0.75 to 2.5 parts by weight per 100 total parts by weight of said monomer(s).

DISCUSSION OF DETAILS AND PREFERRED EMBODIMENTS

Chain transfer agents or modifiers are well known in the emulsion polymerization of diene homopolymers and copolymers. While many types have been proposed, it is preferred to use the alkyl and/or aralkyl mercaptans having from 8 to 18 carbon atoms. Of these, the tertiary alkyl mercaptans are much preferred. Examples of some mercaptans are n-octyl mercaptan, n-dodecyl mercaptan, t-octyl mercaptan, t-dodecyl mercaptan, p-tridecyl mercaptan, tetradecyl mercaptan, hexadecyl mercaptan and so forth and mixtures thereof.

The conjugated dienes are well known and can be butadiene-1,3, isoprene, 2,3-dimethyl butadiene, chloroprene and the like having from 4 to 6 carbon atoms and mixtures thereof. One or more polymerizable vinyl monomers having not over 14 carbon atoms and copolymerizable with one or more of the foregoing dienes can be a nitrile like acrylonitrile, methacrylonitrile; an amide like acrylamide, methacrylamide and ethacrylamide; an acrylate like methyl acrylate, ethyl acrylate, butylacrylate, ethyl hexyl acrylate and octylacrylate; an alkacrylate like methyl methacrylate, ethyl methacrylate, butyl methacrylate, methyl ethacrylate, ethyl ethacrylate, butyl ethacrylate, hydroxyethyl methacrylate and octyl ethacrylate; an acid like acrylic acid, methacrylic acid, ethacrylic acid, maleic acid, maleic anhydride, itaconic acid and citraconic acid; an aromatic like styrene, alpha methyl styrene, p-tertiary butyl styrene, methyl vinyl toluene and para vinyl toluene; a pyridine like 2-vinyl pyridine, 4-vinyl pyridine, 2-methyl-5-vinyl pyridine and 5-ethyl-2-vinyl pyridine; and the like and mixtures thereof. In copolymers of the diene monomer(s) and the vinyl monomer(s), the diene monomer is used in a major molar amount and the vinyl monomer is used in a minor molar amount. Examples of polymers are polybutadiene-1,3, polychloroprene, polyisoprene, butadiene-1,3-styrene copolymer, butadiene-1,3-methacrylic acid copolymer, butadiene-1,3-styrene-2-vinyl pyridine copolymer, butadiene-1,3-methyl acrylate copolymer, butadiene-1,3-acrylonitrile copolymer, butadiene-1,3-acrylamide copolymer and so forth.

Polymerization of the monomers is effected by free-radical catalysts (free-radical formers or free-radical forming systems) such as ammonium, potassium or sodium persulfate, $H_2O_2$ and the like in an amount sufficient for polymerization of the monomers and to obtain the desired molecular weight. Other free-radical catalysts can be used which decompose or become active at the temperature used during polymerization. Examples of other free-radical catalysts are cumene hydroperoxide, dibenzoyl peroxide, diacetyl peroxide, didecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxydicarbonate, azobisdimethylvaleronitrile, 2,2'-azobisisobutyronitrile, 2,2'-azobis-2-methylbutyronitrile and 2,2'-azobis (methylisobutyrate) and the like and mixtures of the same. Only minor amounts of catalyst are necessary to effect polymerization. Free-radical catalysis is well known as shown by "Encyclopedia of Polymer Science and Technology," Interscience Publishers a division of John Wiley & Sons, Inc., New York, Vol. 2 (1965), Vol. 3 (1965), Vol. 7 (1967), and Vol. 9 (1968).

Stabilizers and chelating agents may be used during polymerization. Also, shortstops in free radical polymerization are well known. They are not only used to stop the polymerization in the reactor at the desired conversion but also to prevent further polymerization, cross-linking etc., during stripping, work-up and so forth. Examples of some shortstops are hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate plus sodium hydrosulfite and so forth.

Emulsifiers such as soaps, surfactants or dispersing agents are used in an amount sufficient to obtain an aqueous emulsion of the water and monomer. Examples of some emulsifiers are potassium laurate, potassium stearate, potassium oleate, sodium dodecyl sulfonate, sodium decyl sulfate and sodium rosinate. See, also, "Materials, Compounding Ingredients and Machinery for Rubber," Publ. by "Rubber World," Bill Communications, Inc., New York, 1977, pages 291–294 and "Encyclopedia of Polymer Science and Technology," Vol. 5, 1966.

Temperatures used during polymerization should be sufficient to effect polymerization by activation of the catalyst and double bonds of the monomer(s). They should not be too high to cause a run-away reaction and not too low to retard polymerization. In general, the temperature may be from about 2° to 90° C. If even lower temperatures are used, it may be desirable to add an anti-freeze material to the polymerization media such as methyl alcohol, ethyl alcohol, propyl alcohol, ethylene glycol or other inert water soluble antifreeze material and so forth.

NaOH, KOH, $NH_4OH$ and so forth may be added to the polymerization reactor before or during polymerization to control the pH as desired.

The water should be free of deleterious materials, and preferably should be distilled or ion exchanged. Sufficient water is used to enable formation of the emulsion and to enable proper mixing or stirring of the ingredients during polymerization to obtain the desired rate and degree of polymerization, heat transfer and so forth. The solids content (after removal of water), thus, may vary from about 10 to 55% by weight, preferably from about 25 to 45% by weight.

Polymerization should preferably be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge monomer, water, catalysts and so forth, venting means, and with means to recover the polymer and so forth. The reactor should be cleaned or flushed out between polymerization runs to remove traces of shortstops, catalysts, modifier, residues and so forth which might interfere with subsequent polymerizations. There should be sufficient agitation or stirring of the polymerization media to ensure thorough mixing, diffusion, contact and so forth. All of the polymerization ingredients except the shortstop may be charged to the reactor at the same time, intermittently, or continuously. Also, the ingredients may be added separately or in a mixture.

Free radical aqueous emulsion polymerization and copolymerization of dienes or dienes and vinyl monomers is well known to those skilled in the art. In this connection please see Whitby et al, "Synthetic Rubber," John Wiley & Sons, Inc., New York, 1954; Schildknecht, "Vinyl and Related Polymers," John Wiley & Sons, Inc., New York, 1952 and "Encyclopedia of Polymer Science and Technology," Vol. 5, 1966, Interscience Publishers, a division of John Wiley & Sons, Inc., New York.

The polymers of the present invention can be mixed with other rubbers, plastics and/or resins, antioxidants, antidegradants, UV light absorbers, stabilizers, curing agents, accelerators, extender oils, preservatives and plasticizers and filled, reinforced or pigmented with carbon black, $TiO_2$, $SiO_2$, $CaCO_3$, $Sb_2O_3$, phthalocyanine blue or green and the like. These polymers, also, may be mixed with foaming or blowing agents and so forth.

The polymers of the present invention may be used with resorcinol-formaldehyde resins in tire cord adhesive dip compositions, with melamine, urea or phenolic resins in carpet backing formulations or adhesives, in paper coatings, in making tires, belts, shoe soles and so forth.

The following examples will serve to illustrate the present invention with more particularity to those skilled in the art. Unless otherwise noted, all amounts were in parts by weight, and all polymerizations were in closed polymerization reactors with means for agitating the contents.

EXAMPLE 1

There were charged to a reactor a mixture of 104.7 deionized water, 1.8 (80% in water) "Dresinate" 214, 0.0914 KOH (45% in water) and 0.153 "Tamol" N; a mixture of 15.8 styrene and 0.07 "Sulfole" 120; and 18.2 butadiene-1,3 and heated to 125° F. When the temperature of the batch reached 125° F., there was charged to the reactor a mixture of 8.5 deionized water and 0.25 potassium persulfate. The temperature was raised to 140° F., and after 4½ hours and at 31% conversion, there was added to the reactor a mixture of 3.4 deionized water, 0.8 "Dresinate" 214 (80% in water), 0.068 "Tamol" N and 0.0406 KOH (45% in water). After 1 hour and at a conversion of about 31%, there was added to the reactor a mixture of 15 styrene, 0.15 "Sulfole" 120 and 18.2 butadiene-1,3. After 57% conversion there was added a mixture of 5.07 deionized water, 1.2 "Dresinate" 214 (80% in water), 0.102 "Tamol" N and 0.061 KOH (45% in water). After 64% conversion there was added a mixture of 13.0 styrene, 0.15 "Sulfole" 120 and 15.6 butadiene-1,3. One hour later there was added a mixture of 9.3 deionized water, 2.2 "Dresinate" 214 (80% in water), 0.187 "Tamol" N and 0.1118 KOH (45% in water). After 88% conversion there was added a mixture of 3.0 styrene and 0.7 "Sulfole" 120. The reaction was carried to 98% conversion (total solids content (TSC) of about 43%); after which, there was added a mixture of 7.4 deionized water, 1.75 "Dresinate" 214 (80% in water), 0.1458 "Tamol" N, 0.0889 KOH (45% in water), and 0.085 DEHA (85% in water). After 5 minutes, there was added a mixture of 0.8 deionized water and 0.2 Y-300. The polymerization mass was then degassed and cooled to 80° F., and there was added a mixture of 0.15 deionized water and 0.15 formaldehyde (37% in water) as a bactericide. A sample of the copolymer was coagulated, milled, dissolved in toluene and filtered to determine the gel content which was found to be 3.8% (without milling a typical 50% gel polymer would give 0%). See Whitby et al supra. The average Mooney viscosity of a sample of the copolymer was ML4 of 30. For Mooney viscosity see "Glossary of Terms Relating to Rubber and Rubber-Like Materials," 1956, American Society for Testing Materials, Philadelphia, Pa., page 67.

EXAMPLE 2

There were charged to a reactor a mixture of 104.7 deionized water, 1.8 (80% in water) "Dresinate" 214, 0.0914 KOH (45% in water) and 0.153 "Tamol" N; a mixture of 15.8 styrene and 0.05 "Sulfole" 120; and 18.2 butadiene-1,3 and heated to 125° F. When the temperature of the batch reached 125° F., there was charged to the reactor a mixture of 8.5 deionized water and 0.25 potassium persulfate. The temperature was raised to 140° F., and after 4½ hours and at about 31% conversion, there was added to the reactor a mixture of 3.4 deionized water, 0.8 "Dresinate" 214 (80% in water), 0.068 "Tamol" N and 0.0406 KOH (45% in water). After 1 hour and at a conversion of about 31%, there was added to the reactor a mixture of 15 styrene and 0.1 "Sulfole" 120, and 18.2 butadiene-1,3. After 57% conversion there was added a mixture of 5.07 deionized water, 1.2 "Dresinate" 214 (80% in water), 0.102 "Tamol" N and 0.061 KOH (45% in water). After 64% conversion there was added a mixture of 13.0 styrene and 0.1 "Sulfole" 120, and 15.6 butadiene-1,3. One hour later there was added a mixture of 9.3 deionized water, 2.2 "Dresinate" 214 (80% in water), 0.187 "Tamol" N and 0.1118 KOH (45% in water). After 88% conversion there was added a mixture of 3.0 styrene and 0.7 "Sulfole" 120. The reaction was carried to 98% conversion (43% TSC); after which, there was added a mixture of 7.4 deionized water, 1.75 "Dresinate" 214 (80% in water), 0.1458 "Tamol" N, 0.0889 KOH (45% in water), and 0.085 DEHA (85% in water). After 5 minutes, there was added a mixture of 0.8 deionized water and 0.2 Y-300. The polymerization mass was then degassed and cooled to 80° F., and there was added a mixture of 0.15 deionized water and 0.15 formaldehyde (37% in water) as a bactericide. A sample of the copolymer was coagulated, milled, dissolved in toluene and filtered to determine the gel content which was found to be 3.8%. The average Mooney viscosity of a sample of the copolymer was ML4 of 54.

EXAMPLE 3

There were added to a reactor a mixture of 8.0 deionized water, 2.0 "Dresinate" 214 (80% in water), and 0.175 KOH (45% in water); a mixture of 5.0 deionized water and 0.05 "Sequestrene" Na$_3$; 106.7 deionized water; a mixture of 15.0 styrene and 0.08 "Sulfole" 120; 70.0 butadiene-1,3 and 15.0 2-vinyl pyridine. The contents of the reactor then were heated to 120° F., and there was charged to the reactor a mixture of 10.0 deionized water and 0.3 potassium persulfate. At 35% conversion there was added a mixture of 0.08 "Sulfole" 120, 1.0 deionized water, 0.125 "Dresinate" 214 (80% in water) and sufficient KOH (45% in water) to obtain a pH of 10.1. At 67% conversion there was added a mixture of 0.08 "Sulfole" 120, 1.0 deionized water, 0.125 "Dresinate" 214 (80% in water) and sufficient KOH (45% in water) to obtain a pH of 10.0. At 86% conversion (35% TSC) there was added 1.0 "Sulfole" 120, 2.0 deionized water, 0.25 "Dresinate" 214 (80% in water) and sufficient KOH (45% in water) to make a pH of 10.1. Polymerization was carried to about 96% conversion, and there was added a mixture of 1.0 deionized water, 0.1 DEHA and 0.1 Y-250. After the last addition was well mixed in, there was added a mixture of 3.0 deionized water, 0.75 "Dresinate" 214 (80% in water) and 0.066 KOH (45% in water). After stripping, samples of the latex were handled as described in Example 1 and exhibited a gel content 13.3% and an average Mooney viscosity ML4 of 69.5.

EXAMPLE 4

There were added to a reactor a mixture of 8.0 deionized water, 2.0 "Dresinate" 214 (80% in water), and 0.175 KOH (45% in water); a mixture of 5.0 deionized water and 0.05 "Sequestrene" Na$_3$; 108.7 deionized water; a mixture of 15.0 styrene and 0.1 "Sulfole" 120; 70.0 butadiene-1,3 and 15.0 2-vinyl pyridine. The contents of the reactor then were heated to 120° F., and there was charged to the reactor a mixture of 10.0 deionized water and 0.3 potassium persulfate. At 34% conversion there was added a mixture of 0.1 "Sulfole" 120, 1.0 deionized water, 0.125 "Dresinate" 214 (80% in water) and sufficient KOH (45% in water) to obtain a pH of 10.2. At 66% conversion there was added a mixture of 0.1 "Sulfole" 120, 1.0 deionized water, 0.125 "Dresinate" 214 (80% in water) and sufficient KOH (45% in water) to obtain a pH of 10.1. Polymerization was carried to 98% conversion, and there was added a mixture of 1.0 deionized water, 0.1 DEHA and 0.1 Y-250. After the last addition was well mixed in, there was added to the reactor a mixture of 3.0 deionized water, 0.75 "Dresinate" 214 (80% in water) and 0.066 KOH (45% in water). After degassing samples of the latex were handled as described in Example 1 and exhibited a gel content 73% and an average Mooney viscosity ML4 of 107.

EXAMPLE 5

There were charged to a reactor 56.73 deionized water, 0.2 potassium chloride, 0.15 "Sulfole" 120, 6.25 polybutadiene-1,3 seed latex (about 13% solids in water) and 100 butadiene-1,3. The pH was adjusted to 10.9 with KOH (10% in water) as needed. The ingredients were heated to 150° F., and there was added a mixture of 8.271 deionized water and 0.3 potassium persulfate. At 35% conversion there was added a mixture of 12.5 of the same seed latex and 0.15 "Sulfole" 120. At conversion of 46%, 58% and 70%, for each conversion, there was added 12.5 of the same seed latex (for a total of 37.5 for these three steps). At 78% conversion there was added 0.75 "Sulfole" 120. At 98% conversion there was added a mixture of 1.0 deionized water and 0.1 DEHA (85% in water). The latex was degassed, and samples were obtained and tested as described in Example 1, above. The gel content was 39.03%, and the average Mooney viscosity ML4 was 54.

The polybutadiene seed latex was made by charging a reactor with 787.23 deionized water, 18 "Dresinate" 214 (80% in water), 1.235 KOH (45% in water), 0.5 potassium chloride, 0.05 "Sulfole" 120 and 100 butadiene-1,3. The charge was heated to 150° F., and then there was added a mixture of 8.271 water and 0.3 potassium persulfate. The polymerization was carried to about 100% conversion and a TSC of about 13%.

EXAMPLE 6

There were charged to a reactor 56.73 deionized water, 0.2 potassium chloride, 0.1 "Sulfole" 120, 6.25 polybutadiene-1,3 seed latex (about 13% solids in water, the same as in Example 5, supra) and 100 butadiene-1,3. The pH was adjusted to 10.3 with KOH (10% in water) as needed. The ingredients were heated to 150° F., and there was added a mixture of 8.271 deionized water and 0.3 potassium persulfate. At 33% conversion there was added a mixture of 12.5 of the same seed latex and 0.1 "Sulfole" 120. At conversions of 44%, 55% and 67%, for each conversion, there was added 12.5 of the same seed latex (for a total of 37.5 for these three steps). At 98% conversion there was added a mixture of 1.0 deionized water and 0.1 DEHA (85% in water). The latex was degassed, and samples were obtained and tested as described in Example 1, above. The gel content was 86.1% and the Mooney viscosity could not be obtained; too gelled - tore badly.

EXAMPLE 7

There were charged to a reactor 108.456 deionized water, 0.5 "Tamol" N, 0.1 "Sequestrene" Na$_3$, 1.0 "Polystep" B-25 (38% in water), 0.1 potassium chloride, 0.6 methacrylic acid, 0.2 "Sulfole" 120, 0.1 acetic acid and 59.4 butadiene-1,3. The contents of the reactor were heated to 135° F., and there was charged to the reactor a mixture of 10 deionized water and 0.25 potassium persulfate. At 48% conversion there was added to the reactor a mixture of 4.5 deionized water, 0.8 "Polystep" B-25 (38% in water), 0.25 "Sulfole" 120, and 0.2 methacrylic acid. At 50% conversion there was added to the reactor 24.75 butadiene-1,3. At 64% conversion there were added to the reactor a mixture of 4.5 deionized water, 1.0 "Polystep" B-25 (38% in water), 1.0 urea and 0.2 methacrylic acid. After two hours there was charged to the reactor 14.85 butadiene-1,3. At 75% conversion there was added to the reactor a mixture of 3.0 deionized water, 0.5 "Polystep" B-25 (38% in water) and 1.0 "Sulfole" 120. At 95% conversion there was added to the reactor a mixture of 4.0 deionized water, 0.4 "Polystep" B-25 (38% in water), 0.15 DEHA (85% in water) and 1.0 urea. After 15 minutes there was added a mixture of 96.267 water which had been heated to 140° F., afterwards to which had been added 0.4 "Triton" X-100 and then 1.5 KOH (45% in water). The polymerization mixture then exhibited a pH of 8.2. Next there was charged to the reactor a mixture of 2.0 deionized water and 0.3 Y-250. The mixture was degassed, and samples were taken and tested as shown in Example 1, supra. The gel content was 32.2%, and the average Mooney viscosity was ML4 of 52.

SUMMARY OF EXAMPLES 1 to 7

| Ex. | Amount of Modifier pbw on Approx. 100 Monomer | | Total Modifier | Conversion, % | Gel % | Mooney Vis., ML4 | Polymer |
|---|---|---|---|---|---|---|---|
|  | Below 75% Conversion | At or Above 75% Conversion | | | | | |
| 1 | .37 | .70 | 1.07 | 98 | 3.8 | 30 | Bdn/Sty |
| 2 | .25 | .70 | .95 | 98 | 3.8 | 54 | Bdn/Sty |
| 3 | .24 | 1.00 | 1.24 | 96 | 13.3 | 69.5 | Bdn/Sty/VP |
| 4 | .30 | — | .30 | 98 | 73. | 107 | Bdn/Sty/VP |
| 5 | .30 | .75 | 1.05 | 98 | 39.03 | 54 | Bdn |
| 6 | .20 | — | .20 | 98 | 86.1 | Tore | Bdn |
| 7 | .45 | 1.00 | 1.45 | 95 | 32.2 | 52 | Bdn/MAA |

EXAMPLE 8

There were charged to a reactor a mixture of 108.8 deionized water, 2.0 "Dresinate" 214 (80% in water), 0.084 KOH (45% in water) and 0.170 "Tamol" N; a mixture of 9.75 styrene and 0.26 "Sulfole" 120; 45.5 butadiene-1,3; and 9.75 2-vinyl pyridine. The contents of the reactor were heated to 135° F. Then there was charged to the reactor a mixture of 10.5 deionized water and 0.25 potassium persulfate. At 30% conversion there was charged to the reactor a mixture of 4.0 deionized water, 1.0 "Dresinate" 214 (80% in water), 0.042 KOH (45% in water) and 0.085 "Tamol" N. At 59% conversion there was charged to the reactor a mixture of 4.0 deionized water, 1.0 "Dresinate" 214 (80% in water), 0.042 KOH (45% in water) and 0.085 "Tamol" N. At 66% conversion there was charged to the reactor a mixture of 5.25 styrene and 0.14 "Sulfole" 120, 24.5 butadiene-1,3 and 5.25 2-vinyl pyridine. Two hours after the foregoing addition there was charged to the reactor a mixture of 5.26 deionized water, 1.32 "Dresinate" 214 (80% in water), 0.055 KOH (45% in water) and 0.110 "Tamol" N. At 80% conversion there was added to the reactor a mixture of 0.74 deionized water, 0.18 "Dresinate" 214 (80% in water), 0.008 KOH (45% in water), 0.015 "Tamol" N and 1.0 "Sulfole" 120. Between about 94 and 100% conversion samples of the latex were taken and shortstopped with a DEHA (85% in water)-deionized water mixture, coagulated, dried and tested. The conversion was taken to about 100% and shortstopped with DEHA (85% in water)-deionized water mixture. At the end of polymerization the TSC was about 44.4%. The amount of mercaptan added was 0.40 before 75% conversion and 1.00 after 75% conversion. The polymer was a Bdn/Sty/VP copolymer. The results obtained on the tests are shown below:

| Sample | Mooney Viscosity ML4 | % Conversion | % Gel |
|---|---|---|---|
| a | 41 | 94.4 | 0 |
| b | 41 | 95.3 | 0 |
| c | 40 | 95.6 | 0 |
| d | 41 | 97.1 | 10.3 |
| e | 42 | 98.3 | 13.5 |
| f | 43 | 99 | 35.2 |
| Final | 49 | 99+ | 40.2 |

These results show that at high conversions the Mooney viscosity is stable and the gel content is 0 or low and that only near the last part of the conversion does the Mooney viscosity and gel increase. A similar terpolymer prepared without a large modifier addition at or after 75% conversion would have a gel of about 80% at 99+% conversion.

NOTES:

"Sulfole" 120: t-Dodecyl mercaptan; av. mol. wt. 198; calc. purity wt. % 96.8; and sulfur wt. % 15.4. Phillips Petroleum Company.

"Dresinate" 214: Potassium soap of disproportionated rosin. Hercules, Inc.

DEHA: Shortstop; diethylhydroxyl amine; and "Pennstop" 1866. Pennwalt Corp.

"Sequestrene" Na$_3$: Trisodium ethylene diamine tetracetate monohydrate. Ciba-Geigy Corporation.

"Tamol" N: Sodium salt of condensed naphthalene sulfonic acid. Rohm & Haas Co.

Y-250: Defoamer; specific gravity of 0.91–0.93; boiling point of 295° F.; flash point of > 250° F., COC; water dispersible; and opaque, gray-yellow liquid moderate mineral oil odor. Drew Chemical Corp.

Y-300: Defoamer; specific gravity of 0.91–0.93; boiling point of 295° F., flash point of > 250° F., COC; water dispersible; and opaque, grey-yellow liquid moderate mineral oil odor. Drew Chemical Corp.

"Triton" X-100: Alkylaryl polyether alcohol (OPE 9 to 10); the ethylene oxide adduct of octyl phenol such as t-octyl phenol having 9–10 ethylene oxide groups; Sp. gr. 1.065; nonionic; 100% active liquid; and viscosity at 25° C. of 240 cps. Rohm & Haas Company.

"Polystep" B-25: Sodium lauryl sulfate, an emulsifier. Stepan Chemical Co.

The embodiments of the invention in which an exclusive property or privilege is claimed are defined as follows:

1. In the method of aqueous emulsion free radical polymerization of at least one conjugated diene monomer having from 4 to 6 carbon atoms or a mixture of a major amount by weight of at least one conjugated diene monomer having from 4 to 6 carbon atoms and a minor amount by weight of at least one copolymerizable vinyl monomer having not over 14 carbon atoms using an alkyl or aralkyl mercaptan chain transfer agent having from 8 to 18 carbon atoms, the improvement which comprises at at least 75% conversion of total monomer(s) to polymer adding an additional amount of said agent to the polymerization system in an amount of at least 1½ times by weight of the amount by weight of said agent added to the system prior to said 75% conversion of total monomer(s) to polymer(s) and stopping the polymerization in the range of from about 90 to 99+% conversion to obtain a processable polymer with a reduced amount of gel, the total amount of said agent used during the polymerization being from about 0.75 to 2.5 parts by weight per 100 total parts by weight of said monomer(s).

2. The method according to claim 1 in which the agent is a tertiary alkyl mercaptan.

* * * * *